United States Patent Office 3,379,271
Patented Apr. 23, 1968

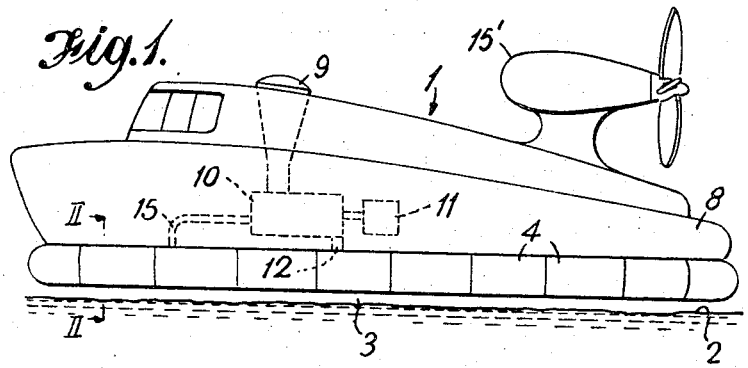
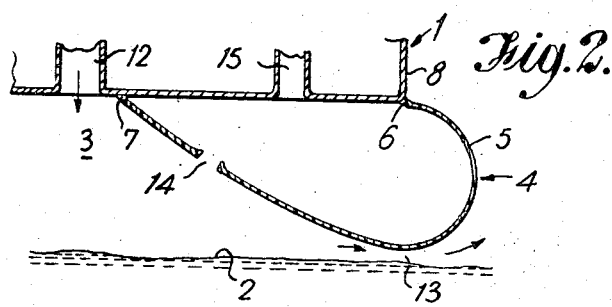
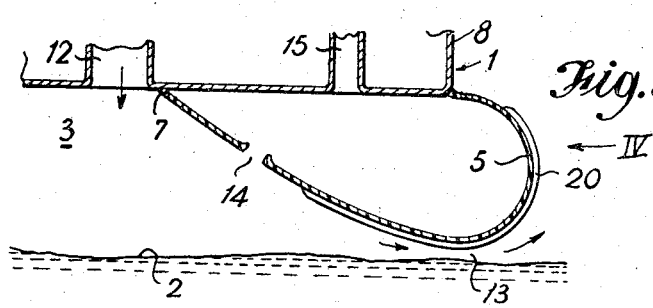
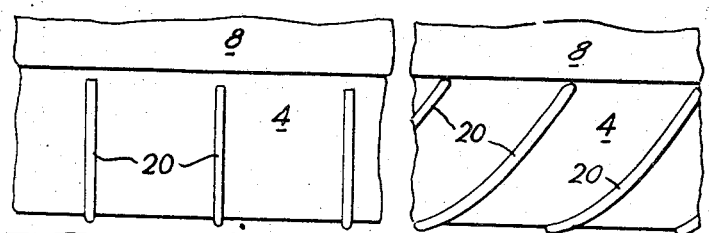

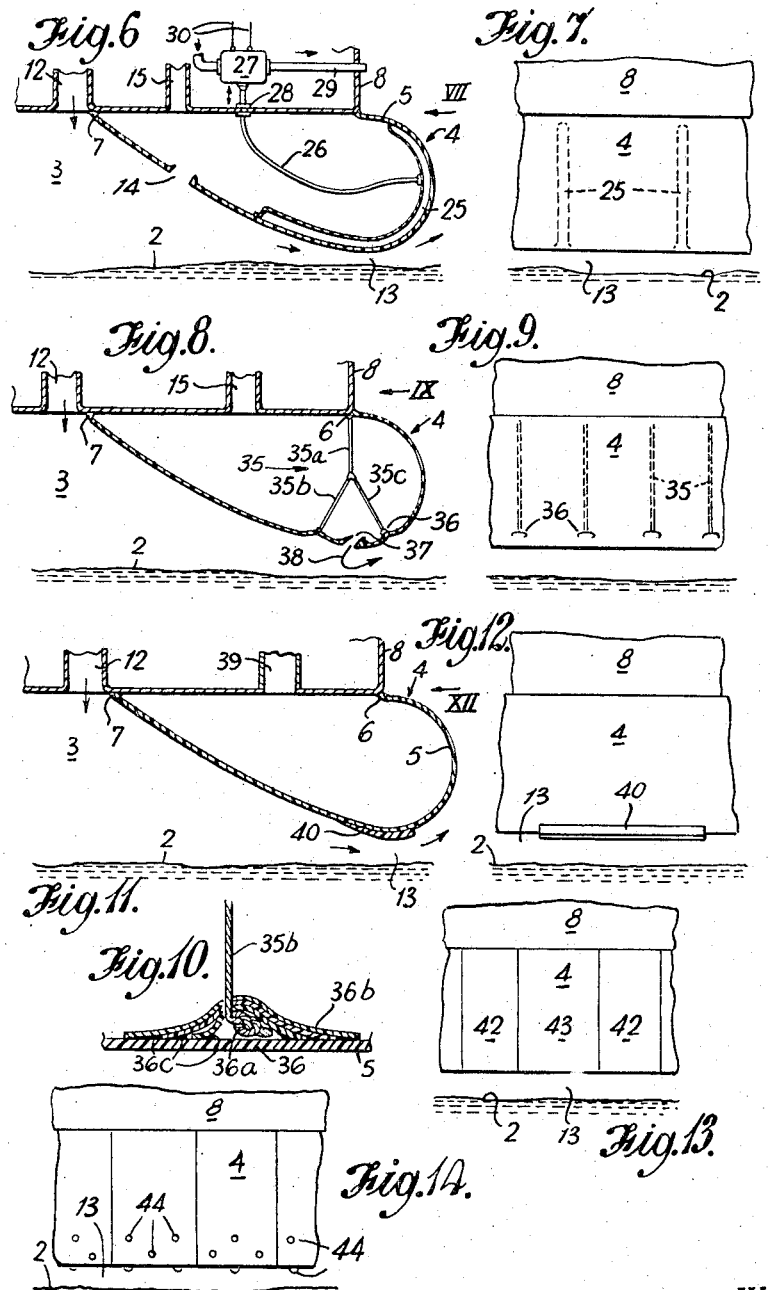

3,379,271
VEHICLES FOR TRAVELLING OVER A SURFACE PROVIDED WITH FLEXIBLE SKIRTS OF DIFFERING STIFFNESSES
Leslie Arthur Hopkins, Dibden Purlieu, Southampton, and Robert Granville Moore, Hythe, Southampton, England, assignors to Hovercraft Development Limited, London, England, a British company
Filed Sept. 7, 1965, Ser. No. 485,175
Claims priority, application Great Britain, Sept. 14, 1964, 37,439/64)
3 Claims. (Cl. 180—128)

ABSTRACT OF THE DISCLOSURE

A gas cushion vehicle having an inflatable skirt attached to the body of the vehicle and laterally bounding the cushion space, the skirt being made from flexible sheet material and having portions of differing stiffnesses distributed along the cushion boundary, at least in the bottom region of the skirt, so as to dampen vibrations of the skirt caused by the escape of gas from the cushion when the skirt is deflected by obstacles. The portions of different stiffnesses may be produced by attaching to the skirt at spaced intervals along the bottom thereof stiffening members or tie-lines extending upwardly to the vehicle body, or by forming the skirt from at least two species of flexible material of differing stiffnesses.

---

This invention relates to gas cushion vehicles, that is to say, vehicles for travelling over a surface and which, in operation, are supported above the surface, at least in part, by one or more cushions of pressurised gas formed and contained beneath the vehicle.

It has been proposed to contain the cushion for at least part of its periphery by attaching downwardly depending wall structures to the vehicle body. The flexible wall structures may comprise, at least in part, flexible inflatable skirts. During normal operation of the vehicle, the lowermost portions of the flexible skirts have a small clearance from the surface beneath the vehicle which may be due to the escape of gas from the cushion between the flexible skirts and the surface (examples of which are disclosed in patent No. 3,219,237) or additionally or alternatively due to the downward discharge of one or more fluid curtains from the structures to provide lateral containment of the gas in the cushion beneath the structures (examples of which are disclosed by copending application Ser. No. 413, 397).

In order to avoid damage to the flexible skirts due to impact with obstacles, it is desirable that they should deflect readily over the obstacles, and this requires a large degree of flexibility in the inflatable skirts. Unfortunately the escape of atmosphere-seeking gas from the cushion can lead to pronounced vibration of the inflatable skirts which is disadvantageous in that it can be so violent as to lead to damage of the inflatable skirts.

According to the present invention, there is provided a gas cushion vehicle comprising a body and means for forming and containing a cushion of pressurised gas in a space beneath said body, said means including a wall structure which comprises an inflatable skirt made from flexible sheet material and attached to the body along the boundary of the cushion space, said inflatable skirt having a shape, in vertical cross-section, which extends outwardly away from the body, downwardly and then inwardly towards the cushion space and finally upwardly so as to present a convex face downwardly towards the surface over which the vehicle operates, said inflatable skirt having regions of differing stiffnesses distributed lengthwise of the boundary of the cushion space at least in the bottom region of the inflatable skirt.

By arranging that there are the said regions of differing stiffnesses side-by-side in at least the said bottom region of the inflatable skirt any tendency to vibrate in one of the regions of differing stiffnesses will be reduced by the differing vibration characteristics of the adjacent regions of differing stiffnesses on each side which will thus have a damping effect.

There may be a plurality of stiffening means attached to the skirt at spaced intervals along the bottom thereof, and these stiffening means may be attached on the lower convex face of the bottom region of the skirt, or on the upper concave face thereof or on both faces together. The stiffening means may be in the form of strips of flexible material, and they may extend either parallel to said vertical cross-section or perpendicular to said vertical cross-section.

According to another variant of the invention, there may be provided tie lines attached at one end to the bottom region of the skirt and at the other end to the body, the lengths of the tie lines being selected so that when said skirt is inflated, the tie lines are in tension and restrain the regions of the bottom region of the skirt to which they are attached from moving downwards relative to the body as far as the remaining regions of the bottom regions of the skirt so that the lower convex face of the skirt has puckered or dimpled appearance.

According to a further variant of the invention, each of the said regions of the bottom region of the inflatable skirt may be formed from flexible sheets, adjacent flexible sheets differing from one another in stiffness.

According to yet another variant of the invention, the stiffening means may comprise button-like elements attached to the bottom region of said skirt.

Embodiments of the invention will now be described by way of example with reference to the accompanying drawings wherein:

FIGURE 1 is a side view of a vehicle of known form,
FIGURE 2 is a section on the lines II—II of FIGURE 1,
FIGURES 3, 6, 8 and 11 are views similar to FIGURE 2 and illustrate different embodiments of the invention, and
FIGURE 4 is a view looking in the direction of arrow IV of FIGURE 3, and FIGURE 5 is a view corresponding to FIGURE 4 but of a variant thereof,
FIGURES 7 and 9 are views looking in the direction of arrows VII, IX of FIGURES 6 and 8 respectively.
FIGURE 10 shows a detail of figure 9,
FIGURE 12 is a view looking in the direction of the arrow XII of FIGURE 11, and
FIGURES 14 and 14 are views corresponding to FIGURES 3, 5, 7 and 9 but of two other embodiments.

In the drawings, parts which appear in more than one figure will be given the same reference numeral in all the figures.

Referring first to FIGURES 1 and 2, a vehicle 1 travelling over a surface 2 and supported above the surface 2 by a cushion 3 of pressurized air formed beneath the vehicle, has its cushion 3 contained by downwardly depending inflatable skirts 4 attached by an edge 6 to the periphery of the vehicle body 8.

The inflatable skirts 4 are of the kind disclosed in patent No. 3,291,237 and each comprise a sheet or membrane 5 of rubberised fabric extending from a first or outer edge 6 initially in a direction outwardly from the edge 6 away from the cushion 3, and downwardly, then inwardly and finally upwardly, in a substantially smooth curve ending in a second or inner edge 7, so as to present on its bottom surface a convex face presented towards the surface 2. The edges 6, 7 are attached to the periphery and bottom respectively of the vehicle body 8.

The vehicle 1 is propelled over the surface 2 by an airscrew unit 15' and is of the so-called plenum chamber type, atmospheric air being drawn in through an intake 9, compressed in a compressor 10 driven by an engine 11 and fed beneath the vehicle body 8 through a central duct 12. Pressurised air supplied by the duct 12 forms the vehicle-supporting cushion 3 as illustrated in FIGURE 3. The inflatable skirts 4 have pressure-equalising holes 14, and are inflated from ducts 15 connected to the compressor 10. Excess air from the skirts 4 escapes to the cushion through the holes 14 and excess air from the cushion 3 escapes to atmosphere through the clearance 13 between the lowermost, convexly curved surface of each inflatable skirt 4 and the surface 2.

Referring now to FIGURE 3 and 4, an inflatable structure 4 has been modified according to one embodiment of the invention, and, to this end, has been provided with a plurality of discrete stiffening ribs 20, for example of hard rubber, of semi-circular cross-section bonded to the convex surface of the lowermost part and other parts, of the surface of the membrane 5. The stiffening ribs 20 extend in parallel array between the edges 6 and 7, i.e. in a direction normal to the periphery of the cushion 3 so that the regions of the membrane 5 to which they are attached are stiffer than the adjacent unmodified regions of the membranes.

An inflatable skirt 4, so modified, suffers substantially less from vibration than the structure 4 of FIGURE 2, due, it is believed, to the local variation, i.e. increase, in stiffness of the modified structure 4.

By locally varying the stiffness of the inflatable skirt 4, at least peripherally along the lowermost portion thereof, the skirt is effectively divided into separate sections and is less likely to vibrate as a whole. Also, any vibrations occurring in a particular region do not build up to the same magnitude as in the skirt 4 of the embodiment shown in FIGURE 2 because adjacent regions, due to their different stiffnesses and vribration characteristics, have a damping effect on each other. In a modification (not shown) of the embodiment of FIGURES 3 and 4, the ribs 20 are attached on the concave surface of the lowermost, and other parts, of the membrane 5.

FIGURE 5 shows a variant of the embodiment illustrated in FIGURES 3 and 4, in which, instead of each of the strips 20 being disposed in a vertical plane, they are disposed in planes which are intermediate between the vertical and horizontal planes. In this case, the strips are disposed planes at an angle of about 45° to the vertical plane. This arrangement provides adjacent regions of differing stiffnesses which are relatively long and narrow so that the dampening action of adjacent regions on each other can take place over longer boundary lines between the regions thus leading to enhanced stability of the skirt 4.

FIGURES 6 and 7 illustrate another embodiment according to the invention. In this embodiment the inflatable skirt 4 is provided with a plurality of discrete stiffening ribs 25 of circular cross-section bonded to the lowermost and other parts of the inner surface of the associated membrane 5, and extending, in parallel array, between the edges 6 and 7. The ribs 25 are inflatable and are made of thin, rubberised fabric. Inflation of the ribs 25 is through flexible tubes 26 connected to an air-pressure source (not shown) and a supply/vent valve unit 27 carried by the body 8 which is under the control, through signal lines 30, of the pilot of the vehicle.

The tubes 26 are pressure-sealed to the buttom of the vehicle body 8 by glands 28. The vent 29 projects through the side of the body 8 to atmosphere.

The ribs 25 may only need to be inflated when the vehicle 1 is operating over smooth surfaces, such as concrete and generally level land. Over water and rough land surfaces the ribs 25 may not need to be inflated as even in their uninflated state, they may provide sufficient stiffness of the regions of the membrane 5 to which they are attached to reduce the tendency to vibrate, as previously explained. In addition, it sometimes happens that over irregular surfaces continuous up and down movement of the inflatable skirt as a whole, resulting from its tendency to keep the clearance 13 substantially constant, is likely to dampen any tendency to vibration. However, the circumstances prevailing may make it desirable to inflate the ribs 25 over water and rough land surfaces.

FIGURES 8 and 9 illustrate yet a further embodiment according to the invention. In this embodiment an inflatable strutcure 4 is provided internally with a row of three-legged tie-cord arrangements 35, each leg 35a, 35b or 35c being formed from a tie-cord attached to the other legs at one end. One leg 35a of each arrangement 35 is anchored to the vehicle body 8 and the other two legs 35b, 35c are attached to the inner surface of the membrane 5, at the bottom of the inflatable skirt 4. The length of the tie-cord arrangements 35 is selected to be such that the regions or portions of the membrane 5 to which they are attached are restrained against moving downwardly relative to the body 8 under the cushion pressure as far as the remaining regions of the membrane 5. When the inflatable skirt 4 is inflated the tie-cords 35b, 35c are in tension and restrain the regions of the inflatable skirt 4 to which they are attached to form a series of discrete concavities or dimples 36 arranged in two spaced parallel rows along the bottom of the inflatable skirt 4. FIGURE 10 shows one manner of attaching a tie-cord, say 35b, to the membrance 5 of the inflatable skirt 4. It will be seen that the end of the tie-cord 35b is formed into a knot 36a, which is trapped between a number of overlapping circular pieces of material 36b secured to the upper concave face of the lowermost part of the membrane 5 by adhesive 36c. This mode of attachment provides a relatively large area over which the restraining force of the tie-cord 35b can be applied, so that any local stresses in the dimple 36 are not so high as to cause damage to the membrane 5. The regions of the dimples 36 have a different stiffness than the remaining regions of th emembrane 5 and reduce the tendency for the inflatable skirt 4 to vibrate. The embodiment illustrated in FIGURES 8 and 9 also includes a further modification in that a supply port 37 is formed in the bottom of the skirt, air or other fluid issuing from the port to form a curtain 38. The curtain can be formed by a gaseous or liquid fluid inflating the skirt 4 from ducts 15 or by a gaseous or liquid fluid supplied through separate flexible ducts (not shown).

FIGURES 11 and 12 illustrate yet another embodiment according to the invention. In this embodiment the inflatable skirt 4 is provided with a number of discrete ribs 40 which extend along the bottom of the skirt 4 in a broken line parallel to the periphery of the cushion 3. Each rib 40 is of solid rubber or like flexible material, bonded to the exterior of the membrane 5. Vibration of the inflatable skirt 4 is substantially reduced by the local variation in stiffness between the regions with a rib 40, and the regions without ribs 40.

It will be noted that the rib 40 increases in thickness in radial directions outwardly of the cushion 3 so as to be wedge-shaped in vertical cross-section. Air escaping from the cushion 3 follows the lowermost face of the rib 40 and thus is caused to diverge from the membrane 5, the latter curving upwards away from the initially horizontal path of the escaping air. Accordingly, the influence of the escaping air on the skirt 4 is reduced since the interaction of the air and the skirt 4 is limited by their relative divergence, and the tendency of the skirt 4 to vibrate is reduced.

In the modification of FIGURES 11 and 12, no pressure equalising holes 14 are provided and the membrane 5 of skirt 4 is continuous, the skirt 4 being inflated by a separate duct 39. In such an arrangement, the inflation pressure of the skirt 4 can be higher or lower than the cushion pressure and, further, the inflation pressure of the skirt 4 can be varied independently of the pressure of the cushion.

Although in most of the embodiments described, local variation in stiffness is obtained by locally increasing the stiffness, local decrease in stiffness can also be provided. Generally, the material forming the skirt 4 is as thin as possible subject to meeting the stresses imposed by the inflation pressure, and therefore a further local decrease in stiffness may not be practicable, thus a local increase in stiffness may be necessary to provide the stiffness variation. However, it may well be that the skirt is of material which is thicker than is necessary so far as the stresses imposed by the inflation pressure are concerned. For example the resistance to abrasion or to impact with obstacles may require a thicker material. In such cases, it may be possible to join adjacent sections by inserts of a thinner material. This is shown in FIGURE 13 where the inflatable structure 4 is formed, along its peripheral length, from thick strips 42 of flexible material which alternate with thinner strips 43 of flexible material.

In another embodiment of the invention shown in FIGURE 14, local variations in stiffness are obtained by providing button-like elements 44, formed from rubber or other suitable material, on the skirt 4. In FIGURE 14, the button like elements 44 are attached on the downwardly directed lower convex face of the skirt 4, but it is to be understood that elements 44 may be attached on the upwardly directed concave face of the lower portion of the skirt 4, either alternatively or in addition to those on the convex face.

We claim:
1. A gas cushion vehicle comprising a body and means for forming and containing a cushion of pressurized gas in a space beneath the body, said means including an inflatable skirt made from flexible sheet material, said inflatable skirt being attached to the body and forming a lateral boundary of said space, a plurality of cords having first and second ends, means for attaching the first ends to the skirt in at least the bottom region of the inflatable skirt at respective spaced apart locations, and means for attaching the second ends to the body, the cords having respective lengths which are so selected that the distance between the first ends thereof and the body is less than the distance between the body and portions of the inflatable skirt between the locations of said first ends of the cords when said skirt is inflated, whereby the cords are maintained in tension when said skirt is inflated and said skirt then has dimpled regions as viewed from beneath the bottom region thereof, said dimpled regions having a stiffness differing from the stiffness of the bottom region elsewhere.

2. A gas cushion vehicle according to claim 1 in which the flexible material forming the bottom region of the inflatable skirt defines at least one downwardly directed port wherefrom a fluid can be downwardly discharged to form a fluid curtain laterally bounding said space beneath said at least one port.

3. A gas cushion vehicle comprising a body and means for forming and containing a cushion of pressurized gas in a space beneath the body, said means including an inflatable skirt made from flexible sheet-like material, said inflatable skirt being attached to the body and forming a lateral boundary of said space, the inflatable skirt having a shape, in vertical cross-section, which extends outwardly away from the body, downwardly and then inwardly towards said space, and finally upwardly so as to present a convex face downwardly, said inflatable skirt having portions of differing stiffnesses distributed lengthwise of said boundary of said space at least in the bottom region of the inflatable skirt, said portions of differing stiffnesses being formed from at least two species of flexible sheet-like material, said species having stiffnesses which differ, and adjacent ones of said portions of differing stiffnesses being formed from flexible sheet-like material of different species.

References Cited

UNITED STATES PATENTS

| 3,166,137 | 1/1965 | Cooper | 180—7 |
| 3,251,430 | 5/1966 | Veryzer | 180—7 |
| 3,291,237 | 12/1966 | Hopkins | 180—7 |

A. HARRY LEVY, *Primary Examiner.*

UNITED STATES PATENT OFFICE
CERTIFICATE OF CORRECTION

Patent No. 3,379,271                                     April 23, 1968

Leslie Arthur Hopkins et al.

It is certified that error appears in the above identified patent and that said Letters Patent are hereby corrected as shown below:

Column 1, line 46, "3,219,937" should read -- 3,291,237 --. Column 2, line 28, after "has" insert -- a --; line 53, "14" first occurrence, should read -- 13 --. Column 3, line 69, "buttom" should read -- bottom --. Column 4, line 13, "strutcur should read -- structure --; line 24, after "regions" insert -- or portions --; line 31, "membrance" should read -- membrane -- line 41, "th emembrane" should read -- the membrane --.

Signed and sealed this 16th day of September 1969.

(SEAL)

Attest:

Edward M. Fletcher, Jr.

Attesting Officer

WILLIAM E. SCHUYLER, JR.

Commissioner of Patents